United States Patent [19]

Urlik et al.

[11] Patent Number: 5,174,517
[45] Date of Patent: Dec. 29, 1992

[54] MOTION PICTURE FILM SHIPPING AND HANDLING SYSTEM

[76] Inventors: Randall G. Urlik, 7990 S. Clayton St.; Peter T. Quinn, 7319 S. Lafayette Cir. West, both of Littleton, Colo. 80122

[21] Appl. No.: 584,793

[22] Filed: Sep. 19, 1990

[51] Int. Cl.[5] .............................. B65D 85/671
[52] U.S. Cl. ........................ 242/55.18; 352/128; 206/404
[58] Field of Search .............. 242/55.18, 55.19 R, 242/55.19 A, 71.8, 77, 77.3, 77.4, 115, 116, 118.4, 118.6, 118.8; 352/126, 128; 206/398, 402, 404, 406, 408

[56] References Cited

U.S. PATENT DOCUMENTS

| | | | |
|---|---|---|---|
| 1,823,245 | 9/1931 | Wittel | 242/55.18 |
| 2,546,146 | 3/1951 | Popoli | 242/71 B |
| 2,703,684 | 3/1955 | Warfield | 242/72 R |
| 2,846,219 | 8/1958 | Matheson | 242/55.18 |
| 3,353,660 | 11/1967 | Will | 206/406 |
| 3,780,959 | 12/1973 | Burth | 242/55.18 |
| 3,823,890 | 7/1974 | Potts | 242/55.18 |
| 3,883,087 | 5/1975 | Van Praag | 242/71.8 |
| 3,993,260 | 11/1976 | Bauer, Sr. | 242/55.18 |
| 4,030,675 | 6/1977 | Eissfeldt | 242/55.18 |
| 4,629,140 | 12/1986 | LaCasse | 242/71.8 |
| 4,676,370 | 6/1987 | Rudick | 206/406 X |
| 4,744,528 | 5/1988 | Winters | 242/71.8 |
| 4,754,878 | 7/1988 | Bose | 206/398 |
| 4,949,912 | 8/1990 | Bose et al. | 242/55.18 X |

Primary Examiner—Daniel P. Stodola
Assistant Examiner—John P. Darling
Attorney, Agent, or Firm—Terry M. Gernstein

[57] ABSTRACT

A motion picture film shipping and handling system is adaptable for use on either a platter-type movie projector system or on a reel-type movie projector system. The system includes two film supporting flanges with a collapsible hub located therebetween. A central supporting hub is releasably connected to the collapsible hub, and fasteners releasably attach the elements together. A shipping case contains the flanges and the film in a manner which dissipates impact forces to protect the film and the flanges.

40 Claims, 10 Drawing Sheets

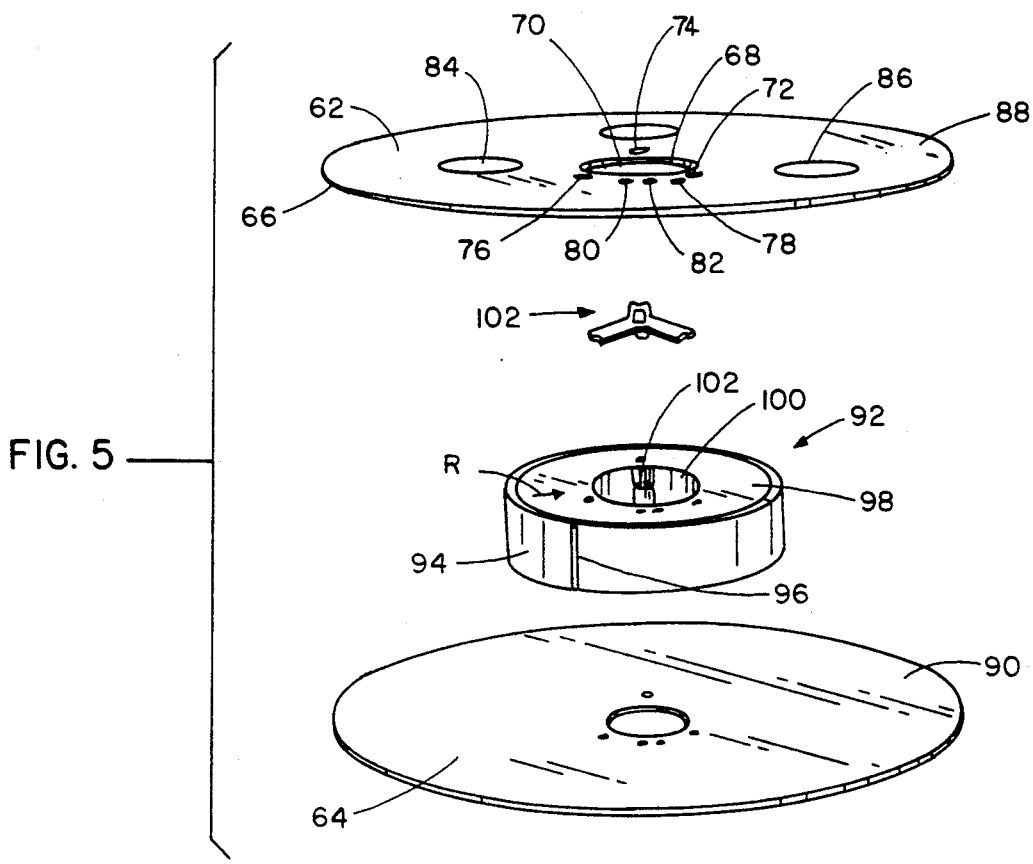
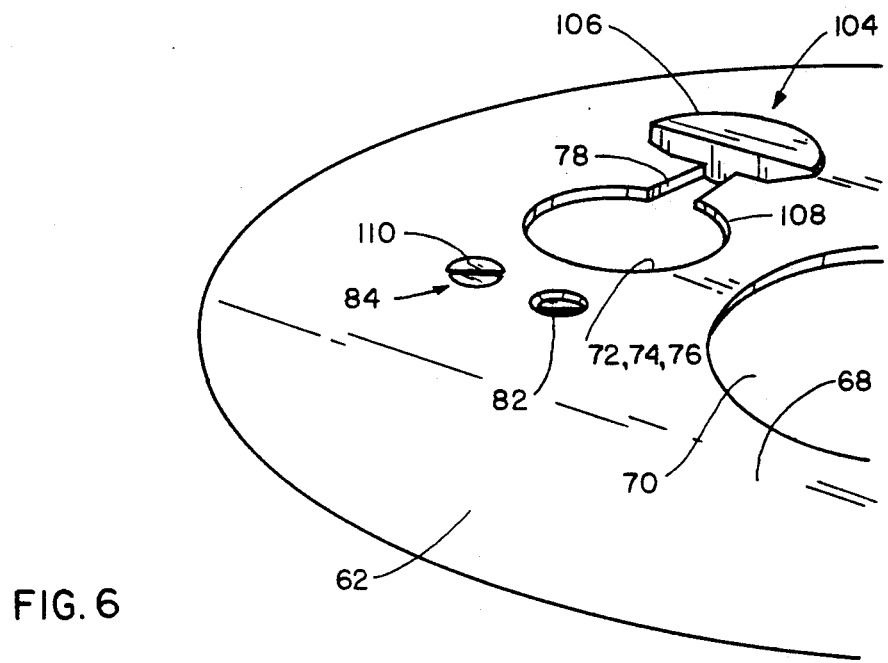

MOTION PICTURE FILM SHIPPING AND HANDLING SYSTEM

TECHNICAL FIELD OF THE INVENTION

The present invention relates to the general art of winding and reeling, and to the particular field of motion picture film handling systems.

BACKGROUND OF THE INVENTION

Modern movie films are generally manufactured in one location and shipped to various distributors located throughout the world. These distributors then move the films to various theaters with whom they are associated. This distribution system has been in place for many years, and has worked well.

However, recent changes in movie film formats as well as theater format have placed a strain on this system. For example, modern films can be in a variety of formats and can be any length including 12,000 feet or longer. Such movie films can weigh 70 or more pounds, and can be easily damaged by improper handling. Heretofore, many producers have shipped a film in multiple segments that are spliced together after receipt to form a single film. Prior to returning, the film must be broken down to its original form. Splicing associated with this shipping method has damaged films, shortened films, deleted frames, and the like.

Still further, many modern theaters are complexes of a plurality of individual movie theaters. Several movies may be run in these complexes, and one feature film also may be shown in several theaters of one complex. This can create several problems. For example, moving a heavy film from one place to another may subject that film and its supporting elements to physical abuse or damage. The film supporting system also can be damaged in this process. Such damage may delay the showing of the film to permit repairing the film or to permit repairing or replacing the handling system. Sometimes, damage to, or loss of, one element of the handling system requires replacing the entire handling system. This can cause extra expense and aggravation for an exhibitor.

Still further, some theaters use a platter-type projection system while other theaters, perhaps in the same complex, use a reel-type projection system. Sometimes, a single theater may use a combination of both a platter-type system and a reel-type system. A platter-type projection system generally involves a horizontal orientation for a film and connection of the film supporting element to a "brain" that controls film movement. On the other hand, a reel-type projection system generally involves attaching a film supporting reel to a projector spindle that is vertically or horizontally oriented. The different projection systems may require a film recipient to assemble films on different handling systems before these films can be shown. If the distributor assembles the films, he must know which system a theater uses before sending a film to that theater. Film assembly at a theater may subject the film to damage due to errors in the assembly process and splicing.

Also, one theater may include both a platter-type projection system and a reel-type projection system. For various reasons, the theater may want to display the film using one system one time, and the other system another time. Presently, if the film is on a handling system designed for a platter-type system, it must be moved to a handling system designed for a reel-type projection system to change display systems, and vice versa. This can be an onerous and expensive task. If, for example, a theater has both types of projection systems, and one system is used as a backup for the other system, that theater may be required to have two shipping and handling systems to effect the change from one system to the other in a reasonable time. This is especially necessary if there is a interruption in display of the film. If the distributor must assemble the film on different shipping and handling systems, the costs of the distribution system may be increased, while the efficiency thereof may be decreased.

Of course, a shipping and handling system must be manufacturable and usable in an efficient and cost-effective manner if it is to be commercially successful. Thus, while a system should be versatile, easy to use and protect the film and its supporting elements, it must still be cost and use efficient.

Therefore, there is a need for a motion picture shipping and handling system that is amenable for use with films of all lengths, including full length feature films, and that can be used with either a platter-type system or a reel-type projection system, yet which is inexpensive to manufacture and use, and which also protects the film and the film handling system from damage.

OBJECTS OF THE INVENTION

It is a main object of the invention to provide a motion picture film shipping and handling system that is amenable for use on both a platter-type projection system and a reel-type projection system.

It is another object of the present invention to provide a motion picture film shipping and handling system that is easily changed from a platter-type system to a reel-type system.

It is another object of the present invention to provide a motion picture film shipping and handling system that fully protects the film and its handling elements during shipping and movement from one place to another.

It is another object of the present invention to provide a motion picture film shipping and handling system that can safely handle and store films of all lengths, including long feature length films.

It is another object of the present invention to provide a motion picture film shipping and handling system that is inexpensive to manufacture and can have the individual parts thereof easily replaced without requiring replacement of an entire system in the event one of the elements is damaged.

SUMMARY OF THE INVENTION

These, and other objects, are achieved by a motion picture film shipping and handling system that includes film supporting elements that are amendable for use with either a platter-type projection system or a reel-type projection system, and which can be easily changed from one form to another. The system also distributes forces in a manner that lessens the effects of an impact force on the film and the elements immediately associated therewith, yet is easy and inexpensive to manufacture and purchase.

Specifically, the system includes film supporting flanges to which a collapsible hub is releasably attached. The collapsible hub has a central hub element releasably attached thereto to permit the film handling system to be vertically supported on a horizontally oriented spindle. The collapsible hub is mounted on the film supporting flanges to be easily removable so the film supporting flanges can be easily removed for a platter-type projection system.

The film shipping and handling system further includes a case that has two identical sections. Each section securely supports the film supporting elements in a manner that distributes impact forces against inertia forces associated with the film and the film handling elements and distributes such impact forces to the case in a way that dissipates such forces. In this manner, the case provides a good deal of protection to the film and its associated handling elements, while the case is still easily replaced if damaged.

Though the collapsible hub is easily collapsed when desired, that hub is strong and can absorb punishment so the film is protected even by the film handling elements themselves.

In this manner, the film shipping and handling system embodying the present invention is very efficient to manufacture,

BRIEF DESCRIPTION OF THE DRAWING FIGURES

FIG. 5 is an exploded perspective view of a film supporting means of the present invention.

FIG. 6 is a partial perspective view of one of the film supporting flanges of the present invention.

DETAILED DESCRIPTION OF THE PREFERRED EMBODIMENT OF THE INVENTION

Figure 1:
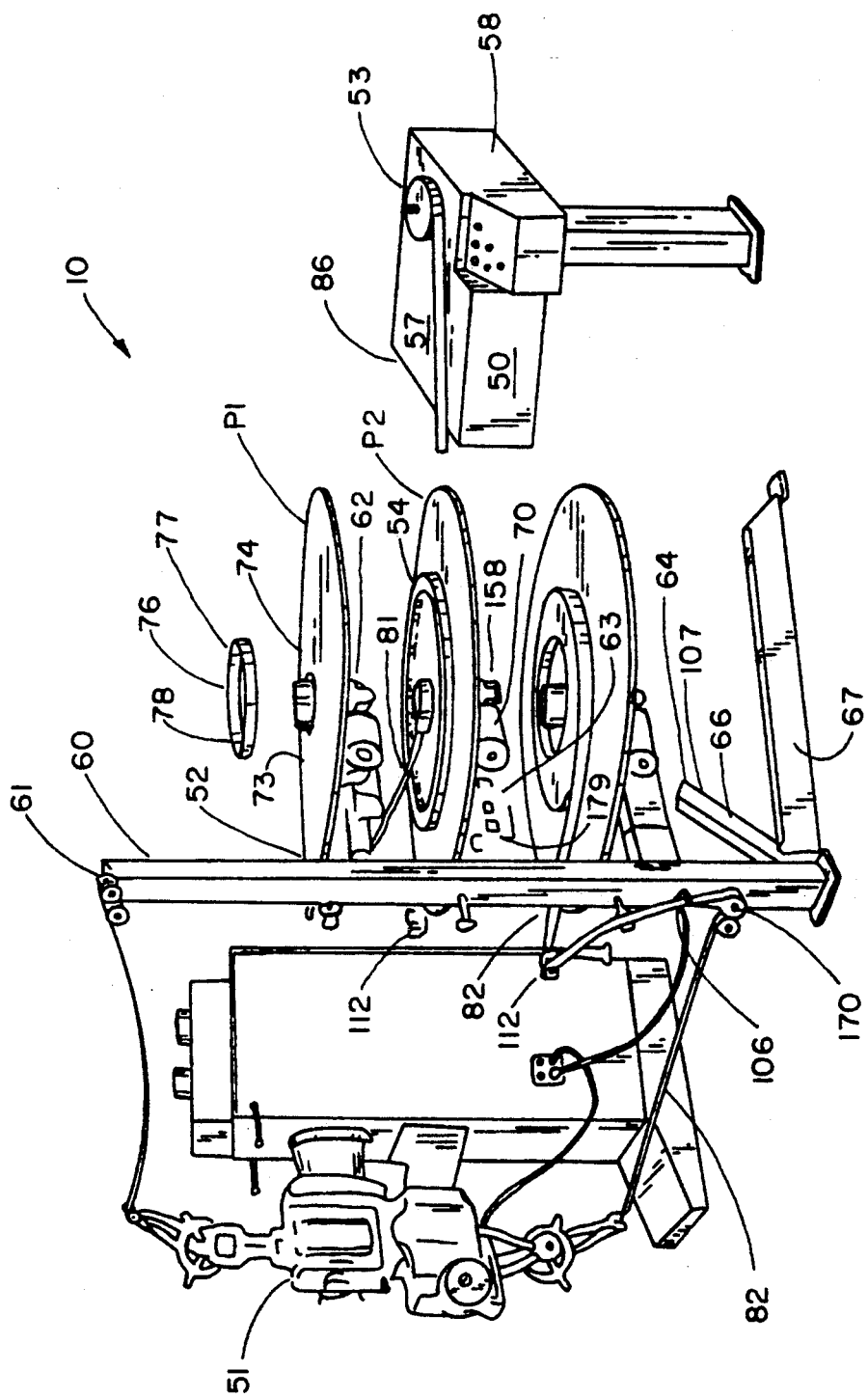
FIG. 1 is a perspective view of a platter-type movie projector system.
Figure 2:
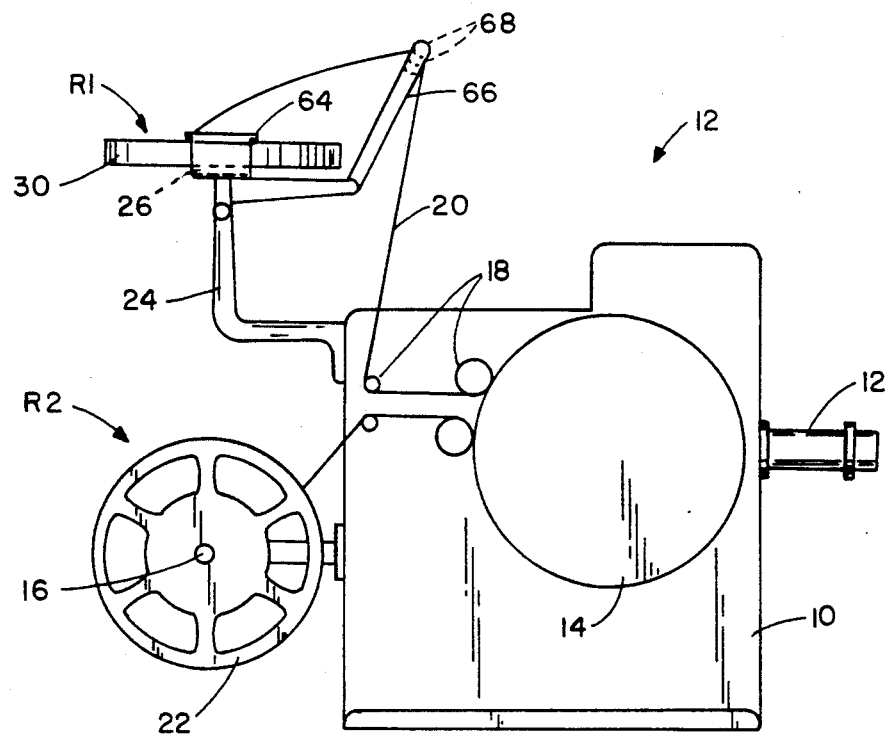
FIG. 2 is a side elevational view of a reel-type movie projector system.

Shown in FIGS. 1 and 2 are two different types of movie projector systems, a platter-type projector system 10 (as disclosed in U.S. Pat. No. 3,823,890) and a reel-type projection system 12 (as disclosed in U.S. Pat. No. 2,546,146), the disclosures of which are incorporated herein by reference. In the case of the platter-type system, film is fed onto and off of horizontally oriented platters, such as platters P1, P2 and P3; whereas in the case of the reel-type system, film is fed onto and off of vertically or horizontally oriented reels R1 and R2. The precise functioning and operation of these types of movie projector systems are known to those skilled in the movie projection art, and are discussed in the incorporated patents, and thus will not be discussed in detail.

Figure 3:
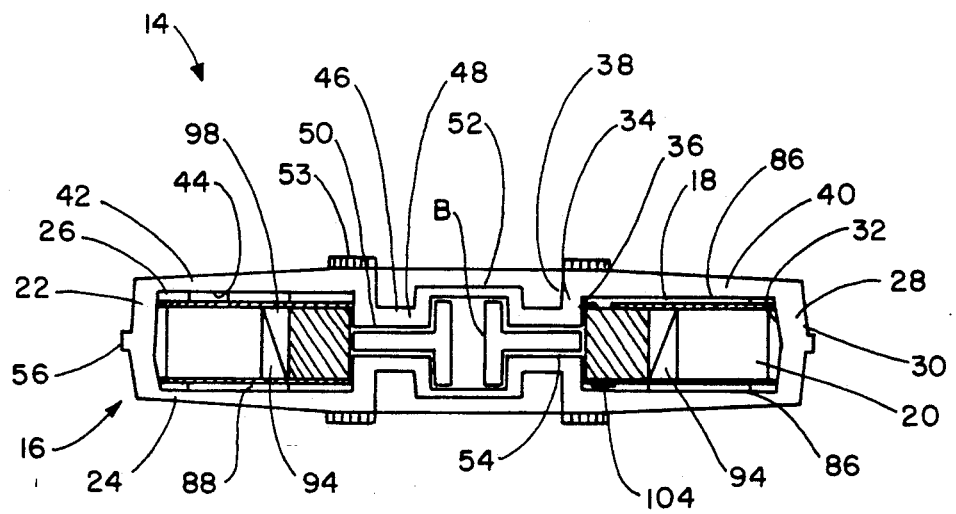
FIG. 3 is a cutaway side elevational view of a motion picture film shipping and handling system embodying the present invention.
Figure 4:
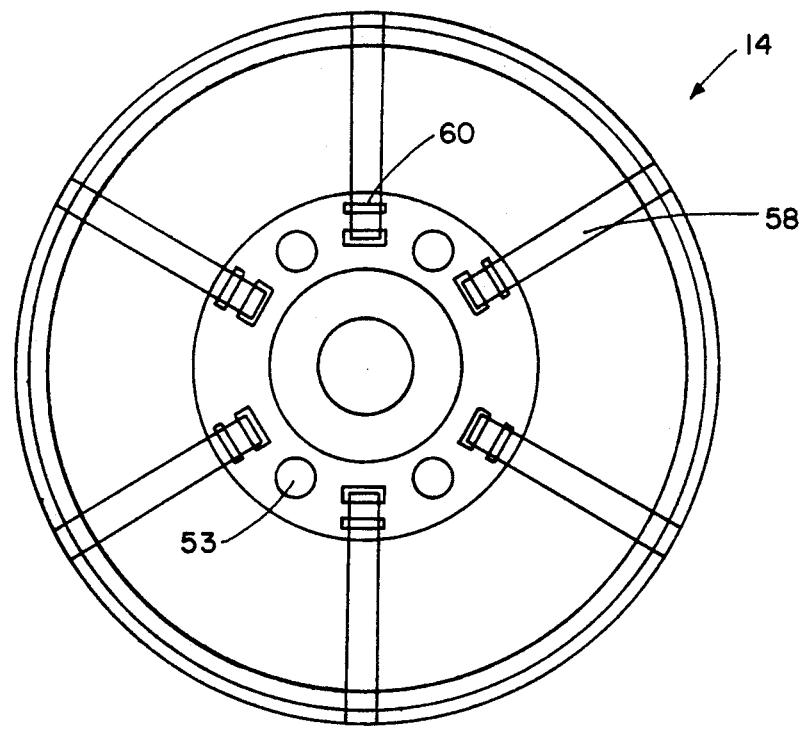
FIG. 4 is a top plan view of the motion picture film shipping and handling system of the present invention.

The motion picture film shipping and handling system 14 of the present invention permits a single film system to be used in conjunction with either of these two major types of movie projectors, and is broadly shown in FIGS. 3 and 4. Broadly, the system 14 includes a case 16 that contains a film supporting system 18 in a manner which protects film 20 and the film supporting system from damage due to mishandling. The film supporting system is adaptable to either the platter-type movie projector 10 or to the reel-type movie projector 12 and is easily transformed from one form to the other as will be understood from the ensuing discussion.

Specifically, the case 16 includes two identical half sections 22 and 24 that fit together to define an annular chamber 26 in which the film and the film supporting system are accommodated. Each case half section includes an annular outer wall 28 having an outer surface 30 with an outer diameter, and an inner surface 32 with an inner diameter. The case half section also includes an annular inner wall 34 having an inner surface 36 with an inner diameter and an outer surface 38, with the inner surfaces 32 and 36 facing each other in the chamber 26. An annular central wall 40 having an outer surface 42, and having an inner surface 44 connects the case outer and inner walls together. An annular web section 46 having an outer surface 48 and an inner surface 50 extends radially inward from the inner wall 34 to a central section 52. Shipping screws, such as screw 53, are also mounted on the case half sections. A central bushing B is also included.

As can be seen in FIG. 3, the case section fit together with the outer edges of the outer walls in abutting contact and the annular web sections and inner walls of each section being spaced apart from the corresponding element of the other section so a web chamber 54 is defined centrally of the case. A circular lip 56 is formed at the location of contact between the section outer walls, and a case closing means is attached to the case sections to keep these two sections in closing contact with each other as shown in FIG. 4. The case closing means preferably includes a plurality of straps, such as strap 58, each attached at one end thereof to one case section and at the other end thereof to the case other section and wrapped around the lip 56. Strap tightening elements, such as cinch element 60, are used to tighten the straps. The straps are preferably resilient material, such as rubber, or the like, and maintain the case sections in closing contact with each other.

The case is made of impact resistant material, such as plastic, or the like, and flexes to dissipate impact forces applied thereto as by dropping or the like. While the straps hold the case sections together, they permit the sections to move relative to each other under the influence of such an impact so the case will give and thus be less likely to be damaged by such impact. When one section moves relative to the other, the impact forces are further dissipated and thus less likely to reach the contents of the case. Any forces that are not dissipated by the flexing of the case are further weakened by the several corners of the case. Still further, the case is built up near the center thereof because the web sections are in close proximity to each other. A nearly solid center section is thus formed, thereby further strengthening the case and adding to its ability to dissipate impact forces applied thereto.

The film supporting system 18 is broadly shown in FIG. 5 as including two identical annular flanges 62 and 64 which are formed of aluminum or the like. Each of the flanges includes an outer edge 66 having an outer diameter which is just slightly smaller than the inner diameter of the inner surface 32 of the outer wall so the flanges are snugly accommodated in the case with the outer edges 66 thereof in contact with the inner surface 32 of the case outer wall. This prevents these flanges from moving when the case is moved. Each flange further includes an inner edge 68 defining a central opening 70 which has a diameter just slightly larger than the inner diameter of the case inner wall. The central openings 70 of the flanges are sized to accommodate a "brain" of a platter system so film supported on the flanges can be moved by the platter system. Accordingly, the case inner wall has an inner diameter essentially equal to the diameter of a platter system "brain."

Each flange also includes a plurality of fastener-receiving holes, such as holes 72, 74 and 76 placed at sixty degree spacings circumjacent to the central hole 70. Each of the fastener-receiving holes has a rectangular slot, such as slot 78 connected thereto. The holes and slots will be discussed in greater detail below. Each flange also includes two set-screw accommodating holes 80 and 82 which extend through the flange for a purpose that will be discussed below. Flexible shock absorbing pads 84 and 86 are mounted on outer surface 88 of each flange, and inner surface 90 of each flange confronts the inner surface of the other flange. The shock absorbing pads contact the inner surface of the case to further ensure that shocks are not transmitted in an unabated fashion to the film supporting system and to further ensure a snug fit of the film supporting system in the case, as well as securing the flange to a platter system.

The film supporting system further includes a collapsible hub system 92 around which film is wound to be supported on one of the flanges 62 and 64. The collapsible hub is releasably mounted to both of the flanges as will be discussed below, and holds these flanges together with the film therebetween. The collapsible hub includes a film winding ring 94 having a slot 96 into which one end of the film is placed to hold the film in position on the film winding ring for winding. The film winding ring is resilient and tends to move radially inward as indicated in FIG. 5 by arrow R. This tendency is resisted by other elements of the collapsible hub to maintain the film winding ring in contact with the film when desired, and to permit that film winding ring to move away from the inner circumference of the film when suitable.

In one embodiment of the system, an annular shipping ring 98 is located within the annular film winding ring to be surrounded thereby. The annular shipping ring 98 has a central opening 100 defined therein to be congruent with the flange central openings 70, which are congruent with each other in the film-supporting configuration. The primary purpose of the shipping ring is to hold the winding ring in an expanded condition against the bias of that ring and is moved when suitable.

The collapsible hub is removed after one of the flanges 62 or 64 has been removed to configure the system to be placed on a platter-type projector system. However, the system also includes a means for associating the film handling system with a spindle of a reel-type projector system. This means includes a center hub element 102 that is releasably attached to the collapsible hub by fastening elements associated with the fastener-receiving holes 72, 74 and 76 which also serve to keep the flanges 62 and 64 connected together. This center hub element is secured to the collapsible hub with sufficient force to support a heavy system with a full length feature film in a vertical orientation on a horizontal spindle associated with a reel-type projection system.

The collapsible hub is in an expanded condition in FIG. 3 with film 20 wrapped tightly therearound for shipping, storage or for playing on a reel-type projector system. The hub collapses when it is released from the flanges, so it can be withdrawn from the center of the film 20 whereby the film can be played on a platter-type projection system.

As best shown in FIG. 6, the fasteners used to connect the flanges together and to the collapsible hub are so-called Norway bolts 104, which extend through the collapsible hub and through each of the flanges 62 and 64. Each Norway bolt includes a large head 106 at each end of a central body 108. The holes 72, 74 and 76 are larger than the Norway bolt heads 106, but the rectangular slots 78 are much smaller than the heads and are just slightly larger than the Norway bolt body 108. This relative sizing permits the Norway bolts to move through the flanges when the heads 106 are aligned with the holes 72, 74 or 76, but causes the bolts to be securely attached to the flanges when the head is adjacent to the slot 78. The bolt bodies extend through the collapsible hub from one flange to the other thereby connecting the flanges to each other and to the collapsible hub when the heads 106 are in the slots 78 of each flange and the collapsible hub is located between the flanges. Other fastening means can also be used in place of the Norway bolts, or a combination of Norway bolts and other fastening means can be used if suitable. The only requirement is the releasable nature of the connection between the flanges and the hub and each other.

Figure 7:
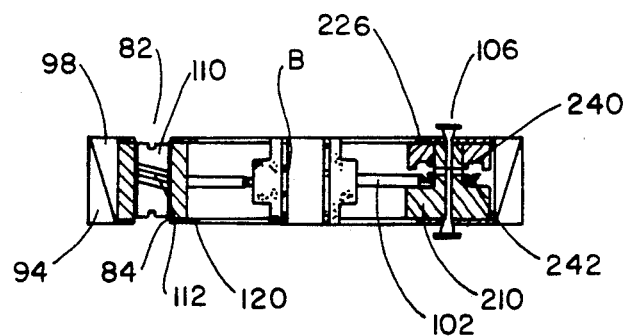
FIG. 7 is a sectional cutaway elevational view of a portion of the film supporting system in which a set screw is in a configuration that permits one flange of that system to rotate with respect to the other flange.
Figure 8:
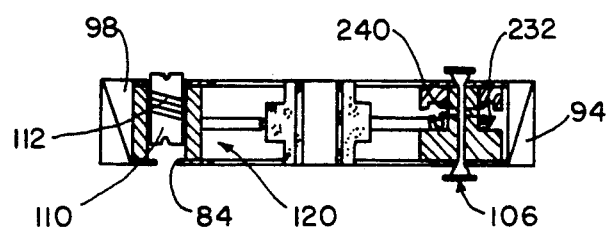
FIG. 8 is a sectional cutaway elevational view of a portion of the film supporting system in a configuration that does not permit one flange of that system to rotate with respect to the other flange.

As can be understood from the above discussion, the flanges 62 and 64 must be rotated with respect to the collapsible hub and to each other to move the Norway bolt heads from the holes into the slots or vice versa. The system includes locking screws 110 to prevent the flanges from undergoing such rotation so the film handling system can be locked in a film holding configuration. As can be seen in FIGS. 6, 7 and 8, a locking screw is accessible through either flange and has an external screw thread 112 that matingly engages a screw thread in the collapsible hub. Rotation of the screw moves it from a position inside the collapsible hub (FIG. 7) which would permit the flanges to rotate with respect to each other and with respect to the hub, to a position with part of the screw protruding from the collapsible hub (FIG. 8) to be located in the screw receiving holes 80 or 82 to thereby prevent rotation of a flange with respect to the collapsible hub that is attached to the other flange. As can be seen in the figures, each screw is accessible through either flange, but can move into rotation-preventing contact with only one flange.

Figure 9:
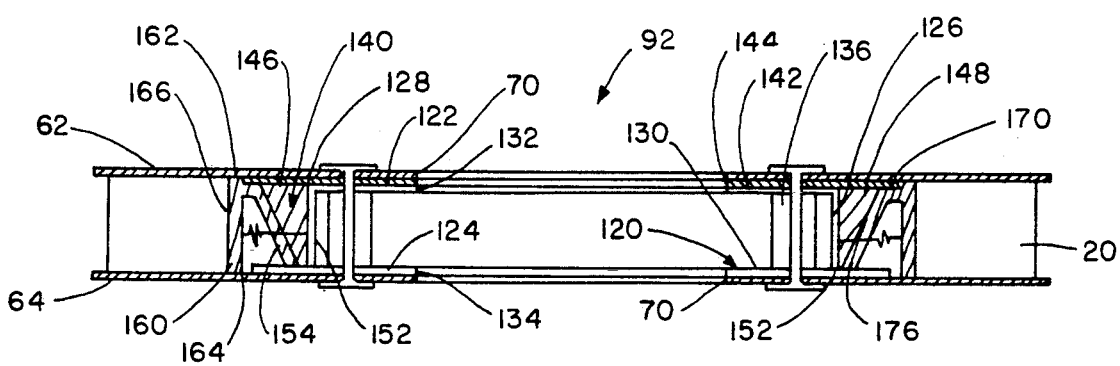
FIG. 9 is a cutaway elevational view of the film supporting system in a fully assembled configuration.

Referring next to FIG. 9, it is seen that the collapsible hub system 92 includes a locking ring 120 to which the flanges 62 and 64 are releasably connected by the Norway bolts, and with which the film winding ring and the shipping means are associated. The locking ring assumes a first form in FIGS. 9-14, and a second form in FIGS. 15-20. The two forms shown differ according to the form of the shipping means.

Specifically, referring to FIG. 9, the locking ring 120 includes an annular top flange 122, an annular lower flange 124, and a web 126 connecting the top flange 122 to the lower flange 124. The top flange 122 and the lower flange 124 extend in plane that are essentially parallel to each other and which are essentially parallel to the planes containing the flanges 62 and 64 when the collapsible hub system is assembled with the flanges 62 and/or 64. The web 126 is cylindrical and connects the outer edge 128 of the top flange 122 to the lower flange 124. In the FIG. 9 form of the locking ring, the web 126 is fixed to an inner surface 130 of the lower flange 124. Both flanges 122 and 124 include central openings 132 and 134 respectively with the inner edges defining these central openings being congruent and congruent with the central opening in the adjacent flange 62 or 64. The flanges 122 and 124, along with the web 126 co-operate to define an H-shape in cross section as shown in FIG. 9.

The Norway bolts extend through the flanges 62 and 6 and through the locking ring flanges 122 and 124 to lock the flanges 62 and 64 to the locking ring. Spacer means 136 surround the Norway bolts between the locking ring flanges 122 and 124 to add support to the collapsible hub system. As will be discussed below, these spacer means can be of various forms, and combinations of forms.

As is also shown in FIG. 9, one form of the shipping means 98 includes an annular ring 140 having an annular base plate 142 which is located adjacent to the locking ring top flange 122 when the shipping ring is in place. The shipping ring base plate 142 has a central opening 144 that is defined to be congruent with the central openings of the flanges 62 and 64 as well as with the central opening in the locking ring. The shipping ring base plate extends outwardly of the locking ring top flange 122 and has an outer diameter essentially equal to the outer diameter of the locking ring lower flange 124, and thus the shipping ring base plate extends radially outward of the locking ring for a certain distance as shown in FIG. 9. The shipping ring base plate 142 is attached to the Norway bolts as shown in FIG. 9.

Figure 10:
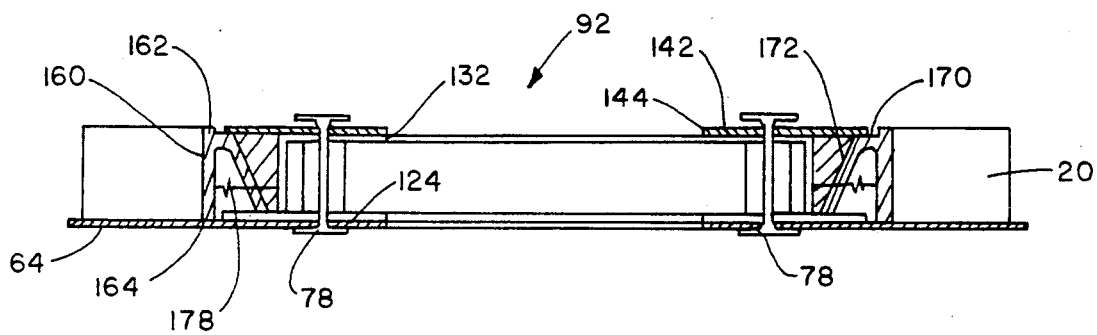
FIG. 10 is a cutaway elevational view of the film supporting system with one of the annular flanges removed to expose the film, the collapsible hub and the central hub element.
Figure 11:
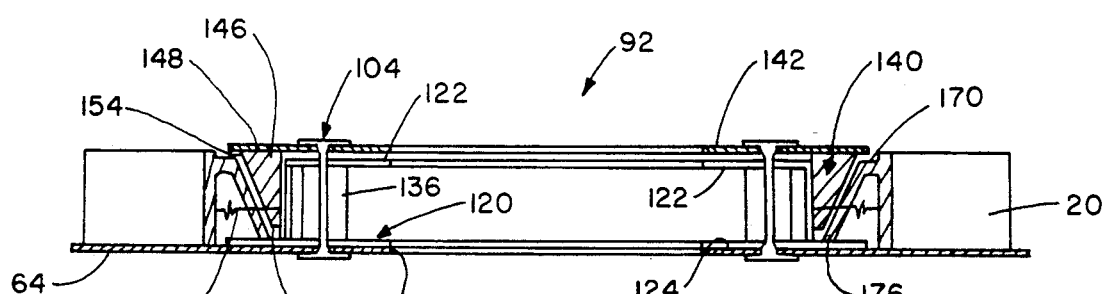
FIG. 11 is a cutaway elevational view of the film supporting system with the shipping ring moved into a position that permits the film winding ring to collapse under its resilient bias.
Figure 12:
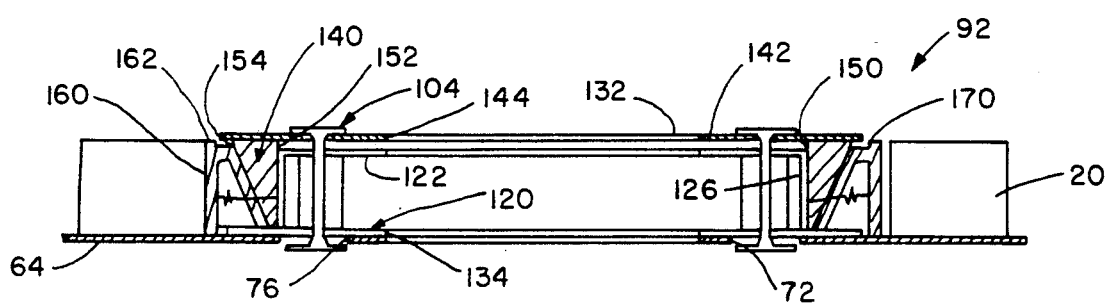
FIG. 12 is a cutaway elevational view of the film supporting system with the film winding ring collapsed against the locking ring.
Figure 13:
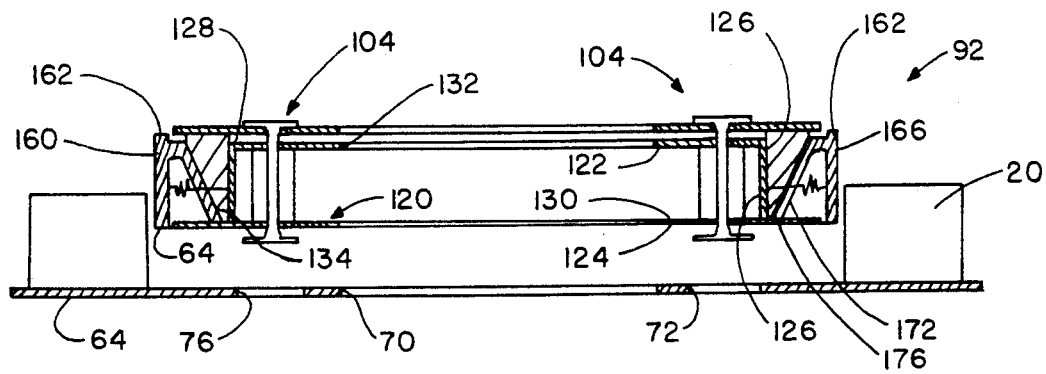
FIG. 13 is a cutaway elevational view of the film supporting system with the collapsible hub partially removed from the film and the flange.

The shipping ring also includes an annular conical body 146 having a base 148 on the shipping ring base plate and an apex 150 located adjacent to the locking ring lower flange 124 The conical body includes a cylindrical inner surface 152 that is located in sliding adjacency with the cylindrical web 126 of the locking ring, and a sloped outer surface 154 that slopes from the shipping ring base plate 142 inwardly towards the cylindrical conical body as it extends towards the apex 150. The shipping ring is adapted to slidingly move from a shipping position with the apex 150 located closely adjacent to the locking ring lower flange as shown in FIGS. 9 and 10, to a hub collapsing position with the apex 150 spaced from the locking ring lower flange as shown in FIGS. 11, 12 and 13.

The film winding ring 94 is also shown in FIGS. 9-20, and includes a cylindrical outer wall 160 having a top rim 162 which engages the flange 62 and a lower rim 164 which engages the flange 64 when the film supporting means is in the FIG. 9 condition. The cylindrical wall 160 also includes an outer surface 166 around which the film 20 is wound. As can be seen, in the FIG. 9 condition, the top edge 162 is coplanar with the top surface of the shipping ring base plate and the lower edge 164 is coplanar with the locking ring lower surface and both edges 162 and 164 are in abutting contact with the flanges 62 and 64 in the FIG. 9 condition.

The film winding ring further includes a sloped section having an annular ring flange 170 extending from an inner surface of the cylindrical wall 160 radially inward, and an annular conical section 172 which slopes inwardly of the film winding ring from the annular ring flange 170 toward the locking ring cylindrical web 126. The conical section 172 has a terminal edge 176 that is coplanar with the top surface of the locking ring lower flange 124. The sloped conical section 172 has a slope that corresponds to and matches the slope of the shipping ring sloped surface 154. The sloped surfaces 154 and 172 slidingly contact each other with the sloped surface 154 riding on and over the sloped surface 172 as can be seen by comparing FIGS. 10 and 11 with each other.

The film winding ring is formed of resilient material, such as plastic, steel or the like, and is biased radially inward as indicated by a spring indicator 178. It is noted that no actual spring element is needed, but the indicator 178 is shown to illustrate the self-bias of the film winding ring towards the shipping means. Furthermore, the ring flange 170 is spaced from the upper edge 162 a distance which equals the thickness of the shipping ring base plate 142. This relative positioning of the ring flange with the film winding ring edge, coupled with the location of the ring flange permits the shipping ring to rest on the ring flange with the upper surface of the shipping ring base plate being essentially coplanar with the upper edge 162 of the film winding ring. This permits the shipping ring base plate to rest on the film winding means ring flange and still permit the film winding ring upper edge 162 and the shipping ring base plate to be in abutting contact with the planar flange 62 when the collapsible hub system is assembled to the flanges 62 and 64.

The film winding ring has an inner diameter that is larger than the outer diameter of the locking ring and larger than the outer diameter of the shipping ring. This relative sizing of the shipping ring and the film winding ring opposes the natural resiliency of the film winding ring, so the film winding ring is biased by its natural resiliency towards the locking ring. However, the shipping ring is interposed between the film winding ring and the locking ring, and thus prevents the film winding ring from moving towards the locking ring when the shipping ring is held in place as shown in FIG. 9. The shipping ring is held in place because the flanges 62 and 64 are coupled together by the Norway bolts and the shipping flange cannot move since it is trapped by the flange 62.

However, once the flange 62 is removed from connection to the locking ring, as indicated in FIG. 10, the shipping ring can slide on the film winding ring from the position shown in FIG. 10 to the position shown in FIG. 11 under the influence of the bias caused by the natural resiliency of the film winding ring. Once the flange 62 is removed, the film winding ring moves from the FIG. 9 position spaced from the locking ring to the FIG. 12 position in close relation to, or in contact with, the locking ring. Such movement of the film winding ring towards the locking ring reduces the outer diameter of the film winding ring as can be seen by comparing FIGS. 12 and 13 to FIG. 11. Reducing the outer diameter of the film winding ring permits this ring to move from engagement with the film 20 thereby freeing this film from the film winding ring.

Figure 14:
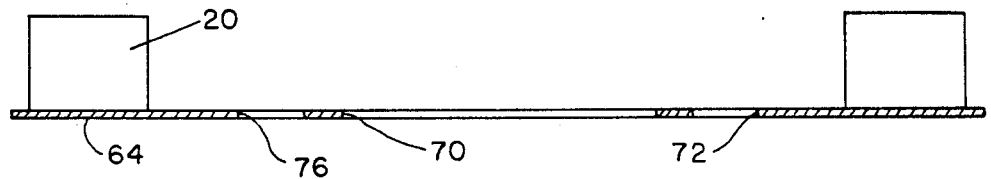
FIG. 14 is a side elevational view of a motion picture film on a flange in condition for use with a platter-type movie projector system.

The locking ring is freed from the flange 64 by rotating the locking ring, which is now free from film, relative to the flange 64 to move the Norway bolts from the slots 78 into the large holes 72, 74 or 76 in the flange 64 thereby freeing the Norway bolts from the flange 64. This is indicated by comparing FIG. 11 to FIG. 12. Once the Norway bolts are thus positioned, the collapsible hub system can be lifted from the flange 64 and from the central location thereof within the film 20, as indicated in FIG. 13. The film is thus left on the flange 64 for connection to a platter-type projection system as indicated in FIG. 14.

The collapsible hub system 92' shown in FIGS. 15–20 is similar to the system shown in FIGS. 9–14 with the exception of the shipping means. Instead of the shipping ring 140, the system 92' includes a plurality of balls, such as ball 180, interposed between the film winding ring sloped surface and the locking ring cylindrical surface. The collapsible hub system 92' has a locking ring 120' that is slightly modified to accommodate the balls 180. The locking ring 120' includes a top flange 132' that extends radially outward from the web 126 to have an outer edge 182 that is congruent with the outer edge of the lower flange 124. The top flange thus traps the balls between the film winding ring and the web of the locking flange in the manner of a ball bearing inner and outer ring combination.

Figure 15:
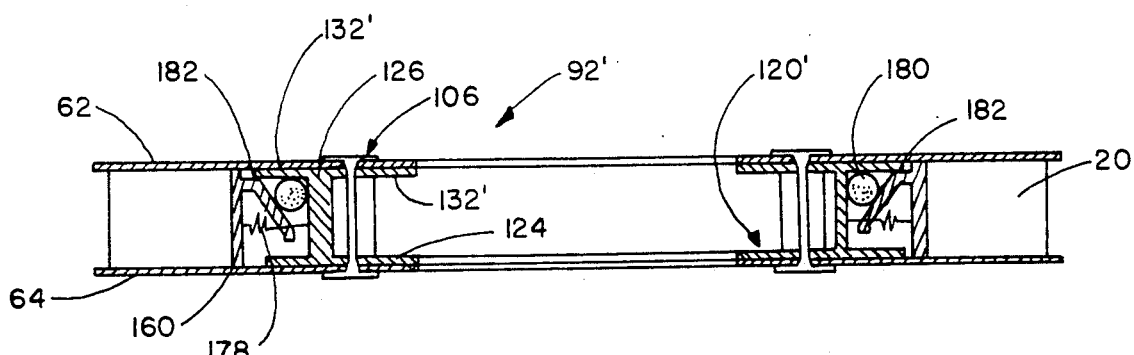
FIG. 15 is a cutaway elevational view of another form of the film supporting system in a fully assembled configuration.
Figure 16:
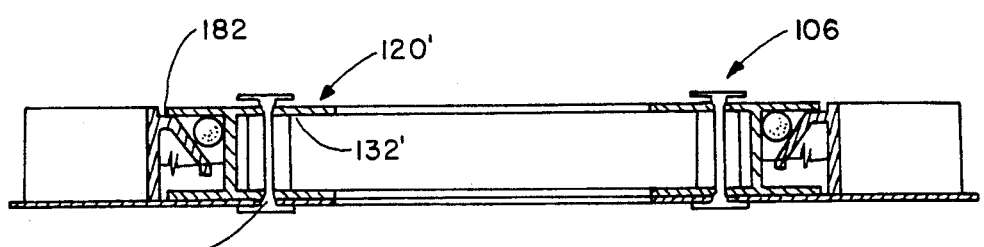
FIG. 16 is a cutaway elevational view of the FIG. 15 film supporting system with one of the annular flanges removed to expose the film, the collapsible hub and the central hub element.
Figure 17:
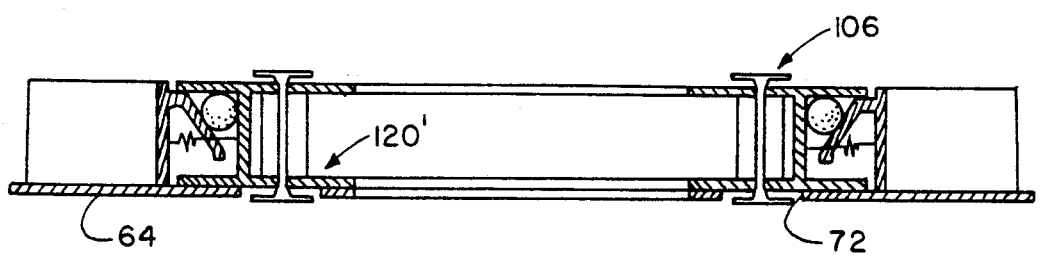
FIG. 17 is a cutaway elevational view of the FIG. 15 film supporting system with the locking ring moved into a position to free that locking ring from the other flange, to permit the film winding ring to collapse under its resilient bias.
Figure 18:
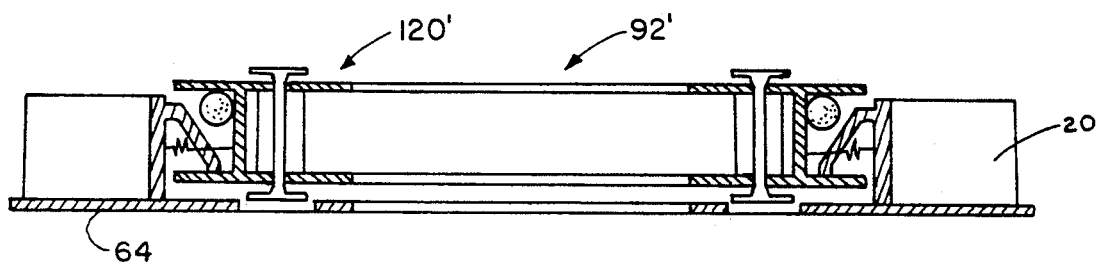
FIG. 18 is a cutaway elevational view of the FIG. 15 film supporting system with the film locking ring and shipping means moved with respect to the film winding ring to permit the film winding ring to collapse toward the locking ring.
Figure 19:
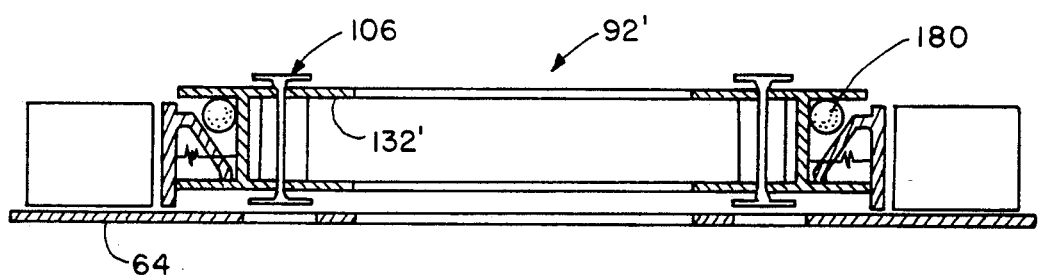
FIG. 19 is a cutaway elevational view of the FIG. 15 film supporting system with the film winding ring collapsed away from the film and the collapsible hub partially removed from the film and the flange.
Figure 20:
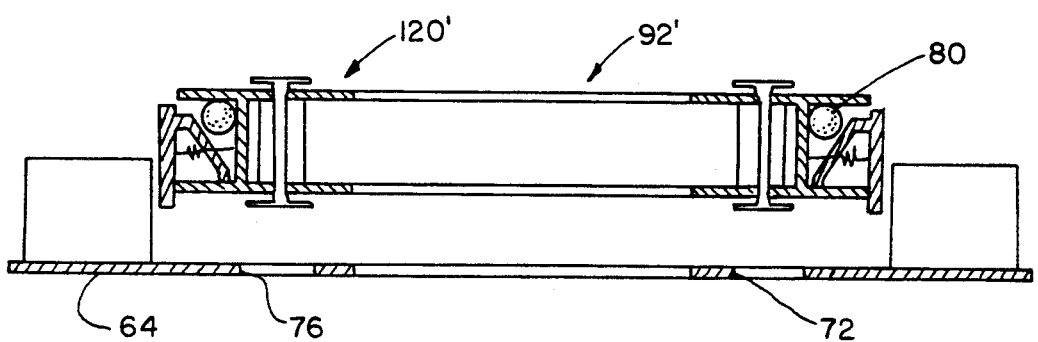
FIG. 20 is a cutaway elevational view of the FIG. 15 film supporting system with the collapsible hub nearly completely removed from the film and the flange.

The system 92' operates in a manner similar to the operation of the just-described system 92 with the balls 180 acting as the shipping means that prevents the resiliently biased film winding ring from moving from its outwardly spaced position shown in FIG. 15 to its film releasing position adjacent to the locking ring shown in FIG. 9. The flange 62 is locked to the locking ring 120' by the Norway bolts, and when the flange 62 is rotated with respect to the system 92', the Norway bolts move into the large holes so the flange 62 can be removed from the system 92'. Removing the flange 62 from the system 92' permits the film winding ring to move inwardly towards the locking ring, thereby decreasing the outer diameter of the film winding ring and removing it from frictional contact with the film 20. This permits the hub 92' to be rotated with respect to the flange 64 to free the Norway bolts from connection to the flange 64 as can be seen by comparing FIG. 16 to FIG. 17. This, then, frees the hub system 92' from the flange 64 and permits it to be moved from the FIG. 17 position to the FIG. 18 position off of the flange 64 and away from the film 20. The inward movement of the film winding ring is indicated by comparing FIG. 18 to FIG. 19. The freed hub system 92' is then withdrawn from the film 20 as indicated in FIG. 20 so the flange 64 can be connected to a platter-type projector system.

It is to be noted that, while the system has been described as removing flange 62 first, the flange 64 can be removed first, and no limitation in method or structure is intended by such description.

Figure 21:
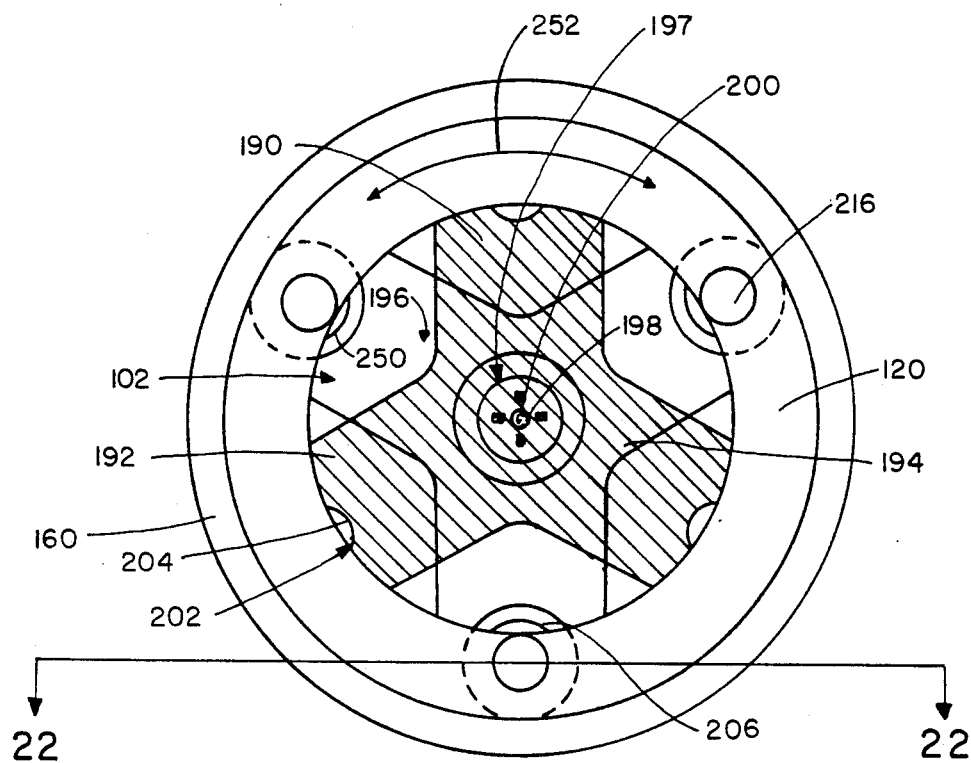
FIG. 21 is a top plan view of the collapsible hub with the central hub element shown in a locked position and in a freed position.
Figure 22:
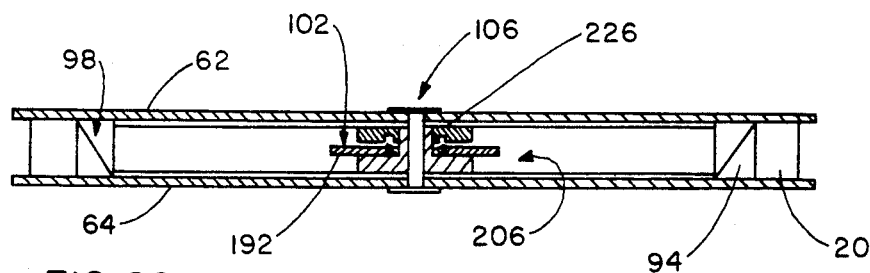
FIG. 22 is an elevational view taken along line 22—22 of FIG. 21.
Figure 23:
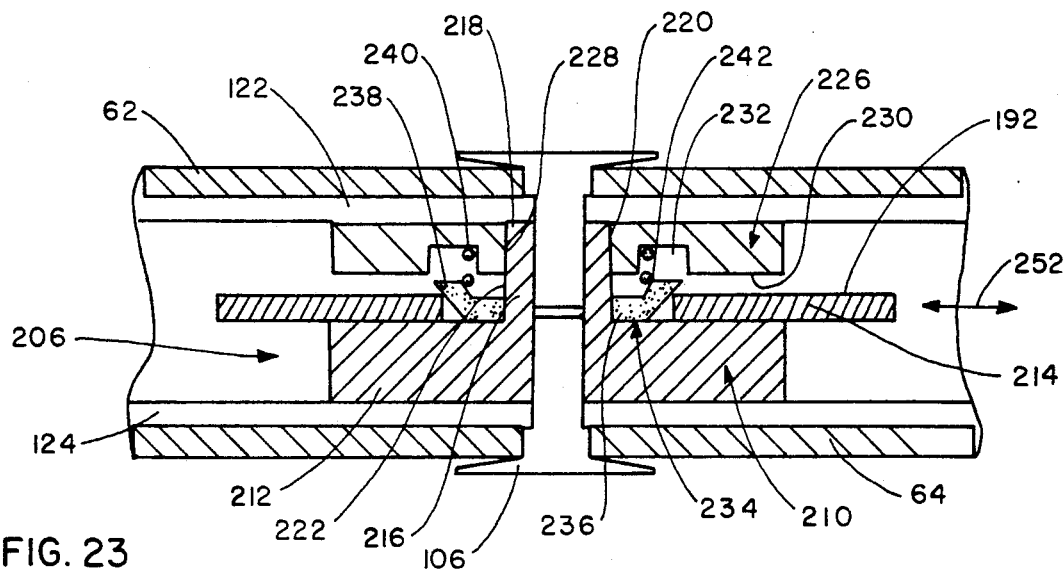
FIG. 23 is a side elevational view of a fastener means used to releasably attach the central hub element to the collapsible hub.

The means for associating the system 14 with a reel-type projector is best shown in FIGS. 21–23. The central hub 102 is shown in FIG. 21 to be movable relative to the locking ring from the position shown in cross hatching to the position shown without cross hatching to free the hub 102 from the locking ring. The central hub 102 is Y-shaped and includes three identical legs 190, 192 and 194 which are Connected together at a central area, indicated in FIG. 21 by reference number 196. The central area has a plurality of spindle receiving holes 197 defined therethrough so the central hub can be releasably and drivingly attached to a spindle associated with a reel-type projector. One central hole 198 is sized to snugly receive the spindle, and other holes, such as hole 200 are sized and located to receive any drive elements associated with such spindle.

Each leg of the central hub includes an outer edge, such as outer edge 202 of leg 192. The leg outer edges include an arcuate concave cutout 204. The central hub is formed of a material that is strong enough to support the film, and the film handling system in a vertical orientation on a reel-type projector. The legs are releasably attached to the locking ring by a plurality of locking elements, such as locking element 206. The locking elements assume one position locking the legs to the locking ring and a second position releasing the legs from the locking ring. The locking elements are best shown in FIG. 23 as including an anvil 210 fixedly mounted on the locking ring lower flange 124 and which includes a circular base 212 having an upper surface 214 and a cylindrical portion 216 extending upwardly from the upper surface 214 to a top surface 218. The top surface 218 is positioned to be adjacent to the locking ring flange 122. The cylindrical portion 216 has a screw thread 220 defined on the outer surface 222 thereof and which extends from the top surface 218 toward the base 212.

An annular clamping screw element 226 is threadably attached to the anvil to move toward and away from that anvil upper surface 214. The clamping screw element 226 includes a circular body having an outer diameter that is slightly less than the outer diameter of the anvil and having an inner diameter that is essentially equal to the outer diameter of the cylindrical portion 216. A screw thread 228 is defined on the clamping screw element to threadably engage the screw thread 220 on the anvil whereby rotation of the clamping screw element moves lower surface 230 of that clamping screw element toward and away from the upper surface 214 of the anvil. An annular notch 232 is defined in the clamping screw element, and a resilient frusto-conical spacer element 234 is located on the anvil cylindrical portion 216 between the clamping screw surface 230 and the anvil surface 214. The spacer element 234 includes a base 236 resting on the anvil surface 214 and a lower edge 238 located between the base 238 and the clamping screw surface 230. A compression spring 240 has one end thereof seated against the clamping screw in the notch 232 and the other end thereof seated against an inner surface 242 of the spacer element. The compression spring resists movement of the clamping screw towards the anvil. A Norway bolt extends through the clamping screw, the anvil cylindrical portion and the anvil base to prevent non-aligning movement of the clamping screw relative to the anvil. While a Norway bolt is shown, other fastening means can be used without departing from the scope of the present invention. Thus, welding, set screws or the like can be used in place of, or in addition to, the Norway bolts. The Norway bolts used in the central hub system can be the Norway bolts described above in reference to the collapsible hub, or some combination thereof. Thus, some Norway bolts can be used in one system and set screws in the other system, or the like as will occur to those skilled in the art based on the teaching of the present disclosure regarding the functions to be performed by the various fastener elements.

The hub element legs 190, 192 and 194 are oriented with respect to the anvil cylindrical portion 216 to located the cutout about that anvil cylindrical portion as indicated in FIG. 23 so the leg is positioned between the clamping screw surface 230 and the anvil surface 214. The clamping screw is rotated by turning that portion thereof that extends out of the locking ring, as shown in FIG. 21 by reference number 250 to move the clamping screw downwardly against the bias of the spring 240 until the clamping screw traps the leg between the clamping screw and the anvil. There are three anvil/clamping screw combinations that are equally spaced apart from each other about the hub system, and thus the central hub element is securely held in place on the locking ring. The spring-loaded spacer elements 234 will hold a leg in place even though the clamping screw is spaced from the anvil. This will keep the central hub element securely in place even though one or more of the clamping screws has been moved away from their associated anvil. This permits a user to tighten the central hub element into place in a temporary fashion if suitable.

Once the clamping screws have been moved away from the anvils, the locking ring can be rotated with respect to the central hub element as indicated in FIG. 21 by double-headed arrow 252 to move the hub element legs off of the anvil cylindrical portions. This frees the central hub element from the locking ring.

The central hub element can remain fixed to the collapsible hub when that hub is collapsed so extra steps need not be included. This also helps to prevent loss of the central hub element when the system is being used with a platter-type projector system.

Figure 24:
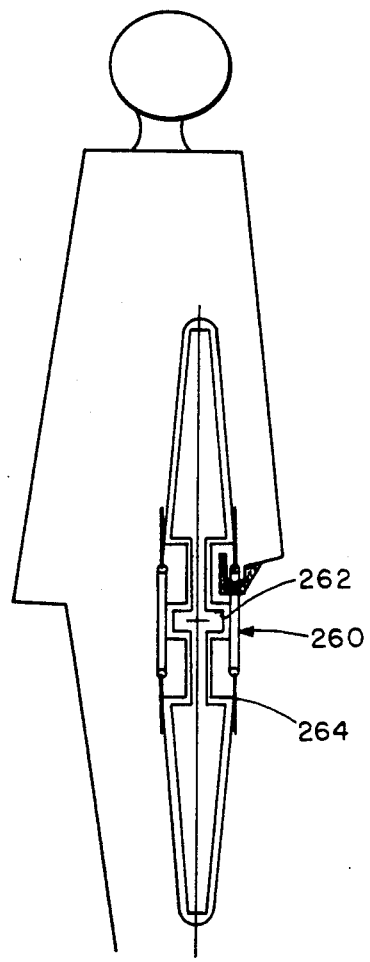
FIG. 24 is a schematic showing a handle for the system of the present invention.

Referring to FIG. 24, it is seen that a carrying handle 260 can be attached to the carrying case so a user can easily carry the case beneath his arm. There are two handles, and each includes a hand gripping element 262 and a connection element 264 that is connected to the case, as at the shipping screws or the like.

Figure 25:
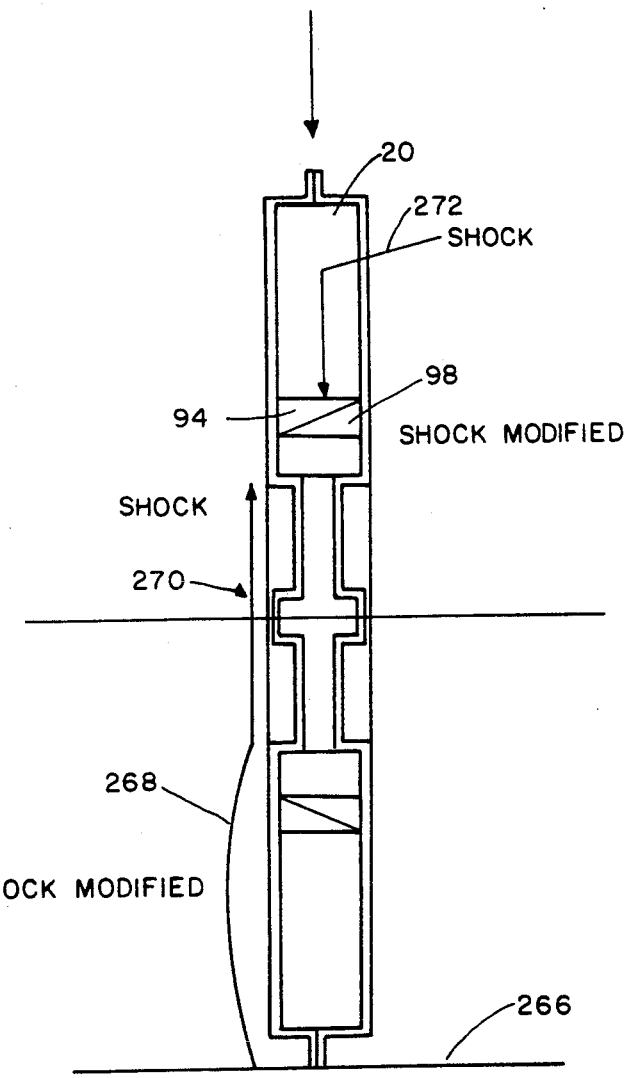
FIG. 25 is a schematic of a case and which indicates how impact forces are dissipated by the system of the present invention.

FIG. 25 shows the above-discussed force distribution associated with an impact of the case on a surface 266. The case flexes, as indicated by curved portion 268 of shock arrow 270. The inertia forces associated with the film 20 are directed in a direction that is opposite to the shock forces, and thus may tend to mitigate the effects of such shock forces on the film or the flanges or the other elements of the film handling system. This shock modification is indicated in FIG. 24 by arrow 272.

Figure 26:
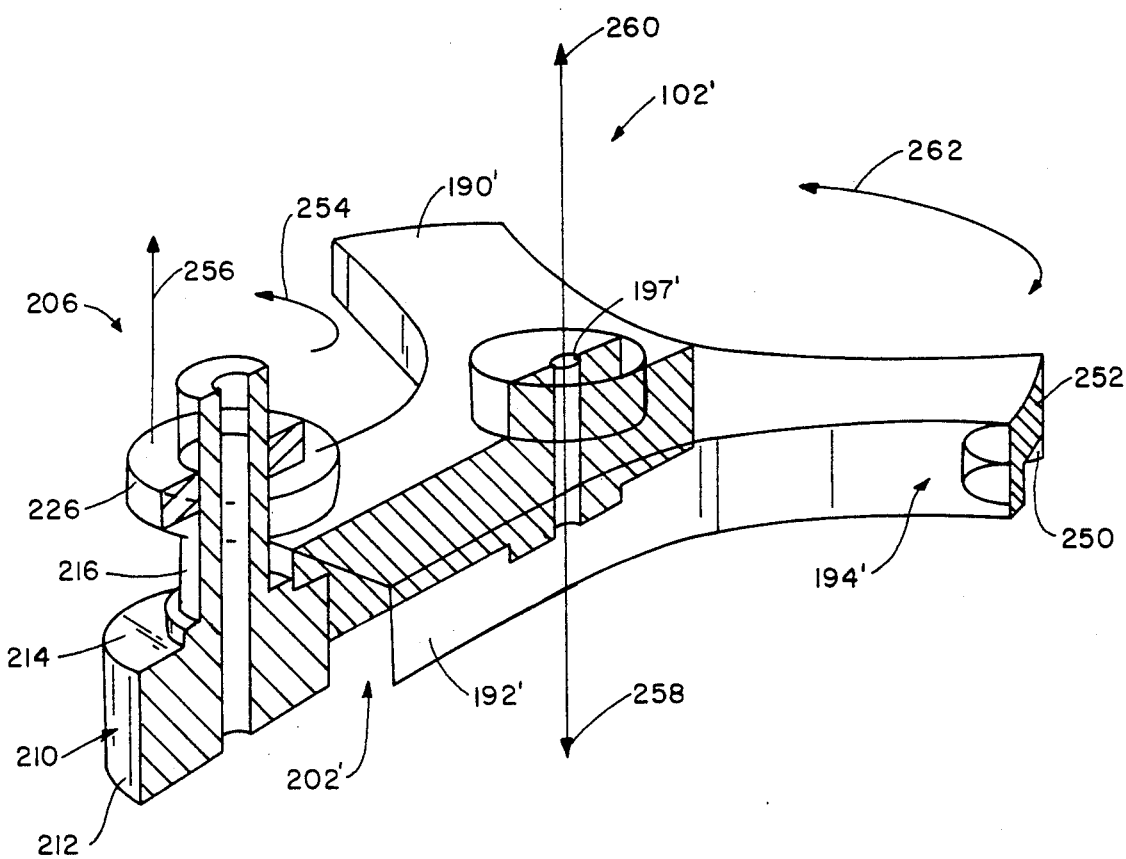
FIG. 26 is a perspective view of an alternative form of fastening means for releasably locking the central hub to the collapsible hub.

A modification of the means for releasably fastening the central hub to the locking ring is shown in FIG. 26. The central hub 102' is slightly different from central hub 102 in that each of the legs 190', 192' and 194' includes a semicircular cutout 250 in the outer edge 202' thereof. These cutouts are shaped and sized to accommodate the base 212 of an associated locking element. Each outer edge includes a ledge 252 which is interposed between base upper surface 214 and clamping screw element lower surface 230. When the central hub 102' is oriented to have the locking element bases received in the cutouts, and the clamping screw elements are rotated, the clamping screw elements can be tightened down against the hub legs. When the clamping screw elements are rotated in direction 254, the clamping screw elements move in direction 256 to release the central hub legs. The central hub is moved in direction 258 along a spindle to place the hub on the clamping element bases, and in direction 260 to lift that hub off of these bases. Once the hub is lifted off of the bases, it can be rotated in directions 262 to unlock the hub from the locking elements.

The method of using the motion picture film shipping and handling system of the present invention is evident from the foregoing discussion, and thus will be discussed in only a sketchy manner. Motion picture film, which can be of any length, even as much as 12,000 feet or more in length, is placed on a single flange of the flanges 62 and 64 about the collapsible hub. The other flange is attached to the first flange using the Norway bolts. The central hub element is attached to the collapsible hub by positioning the leg cutouts adjacent to the anvil cylindrical portions, and tightening the clamping screw elements against each leg adjacent to the cutout portions. The handling system is then placed in one of the carrying case sections, and the other section is placed on top of that section, and the straps tightened.

After receipt of the cased handling system, a recipient removes one of the case sections, and removes the film supporting means from the case. If the handling system is to be used on a reel-type projection system, the handling system is simply attached to the appropriate spindle of that system via the central hub element. On the other hand, if the handling system is to be used on a platter-type projection system, the collapsible hub is removed as above discussed, and the film on the remaining flange is placed on the platter system.

It is understood that while certain forms of the present invention have been illustrated and described herein, it is not to be limited to the specific forms or arrangements of parts described and shown.

We claim:

1. A motion picture film shipping and handling system comprising:
   A) a case which includes
      (1) two substantially identical case half sections, with each half section having
         (a) an annular outer wall having an inner and an outer diameter,
         (b) an annular inner wall having an inner and an outer diameter,
         (c) an annular central wall connected to said inner wall and to said outer wall,
         (d) a hub section connected to said inner wall,
      (2) said inner and outer walls and said central wall of one half section contacting, respectively, the inner and outer walls and the central when one case half section is in contact with the other case half section,
      (3) a case closing means for holding said case half sections together, and
      (4) a plurality of shipping screws threadably mounted on each of said case sections near said hub section of each case section;
   B) a film supporting means accommodated in said case and which includes
      (1) two annular flanges, each flange having
         (a) a central opening with an inner diameter sized so said case inner wall slidably fits into said flange central opening, and
         (b) an outer edge with an outer diameter sized so said annular flange fits snugly against said case outer wall,
      (2) an annular locking ring having an outer surface with an outer diameter greater than the flange central opening inner diameter,
      (3) fastening means releasably connecting said locking ring to each of said flanges,
      (4) a shipping means mounted on said locking ring outer surface, and
      (5) an annular film winding ring which surrounds said locking ring, said film winding ring being resiliently biased towards said locking ring and having an inner surface and an outer surface, said shipping means being located between said film winding ring inner surface and said locking ring outer surface, said shipping means moving from a locking position biasing said film winding ring radially outward away from said locking ring outer surface to an unlocking position permitting said film winding ring to move towards said locking ring outer surface; and
   C) hub means for attaching said film supporting means to a spindle, said hub means including
      (1) a center hub element located adjacent to said annular locking ring central opening and having means for releasably mounting said center hub element to the spindle, and
      (2) fastening means releasably mounting said center hub element to said film supporting means.

2. The motion picture film shipping and handling system defined in claim 1 wherein said annular flanges engage said case sections outer walls and said case inner walls.

3. The motion picture film shipping handling system defined in claim 1 wherein each case section further includes a plurality of strap receiving slots defined therein, and a plurality of straps attached thereto.

4. The motion picture film shipping handling system defined in claim 3 wherein said straps are resilient.

5. The motion picture film shipping handling system comprising:
   A) a case;
   B) a film supporting means which is sized to be contained in said case, said film supporting means including
      (1) two annular flanges, each flange having
         (a) a central opening with an inner diameter sized so said case inner wall slidably fits into said flange central opening, and
         (b) an outer edge with an outer diameter sized so said annular flange fits snugly against said case outer wall,
      (2) an annular locking ring having an outer surface with an outer diameter greater than the flange central opening inner diameter,
      (3) fastening means releasably connecting said locking ring to each of said flanges,
      (4) a shipping means mounted on said locking ring outer surface, and
      (5) an annular film winding ring which surrounds said locking ring, said film winding ring being resiliently biased towards said locking ring and having an inner surface and an outer surface, said shipping means being located between said film winding ring inner surface and said locking ring outer surface, said shipping means moving from a locking position biasing said film winding ring radially outward away from said locking ring outer surface to an unlocking position permitting said film winding ring to move towards said locking ring outer surface; and
   C) hub means for attaching said film supporting means to a spindle, said hub means including
      (1) a center hub element located adjacent to said annular locking ring central opening and having means for releasably mounting said center hub element to the spindle, and
      (2) fastening means releasably mounting said center hub element to said film supporting means.

6. A motion picture film shipping and handling system comprising:
   A) a case which includes
      (1) two substantially identical case half sections, with each half section having
         (a) an annular outer wall having an inner and an outer diameter,
         (b) an annular inner wall having an inner and an outer diameter,
         (c) an annular central wall connected to said inner wall and to said outer wall,
         (d) a hub section connected to said inner wall, (2) said inner and outer walls and said central wall of one half section contacting, respectively, inner and outer walls and the central wall of the other section to define an annular chamber when one case half section is in contact with the other case half section, (3) a case closing means for holding said case half sections together, (4) a plurality of shipping screws threadably mounted on each of said case sections near said hub section of each case section;

B) a film supporting means accommodated in said case and which includes (1) two annular flanges, each flange having
 (a) a central opening with an inner diameter, and
 (b) an outer edge with an outer diameter, (2) a collapsible hub, and (3) fastening means releasably holding said collapsible hub to said flanges and for releasably holding one annular flange to the other annular flanges, C) hub means for attaching said film supporting means to a spindle for associating film on said film supporting means with a real-type movie projection system, said hub means including (1) a center hub element having means for releasably mounting said center hub element to the spindle, and (2) fastening means releasably mounting said center hub element to said film supporting means.

7. A motion picture film shipping and handling system comprising:

a film supporting means, said film supporting means including (1) first means for attaching said film supporting means to a platter-type projection system and which includes a collapsible hub removably attached to said film supporting means, and (2) second means for attaching said film supporting means to a spindle of a reel-type movie projection system, and (3) means releasably connecting said second means to said first means, said film supporting means collapsible hub including (1) two annular flanges, each flange having
 (a) a central opening with an inner diameter, and
 (b) an outer edge with an outer diameter, (2) an annular locking ring having an outer surface with an outer diameter greater than the flange central opening inner diameter, (3) fastening means releasably connecting said locking ring to each of said flanges, (4) a shipping means mounted on said locking ring outer surface, and (5) an annular film winding ring which surrounds said locking ring, said film winding ring being resiliently biased towards said locking ring and having an inner surface and an outer surface, said shipping means being located between said film winding ring inner surface and said locking ring outer surface, said shipping means moving from a locking position biasing said film winding ring radially outward away from said locking ring outer surface to an unlocking position permitting said film winding ring to move towards said locking ring outer surface; and C) hub means for attaching said film supporting means to a spindle, a reel-type movie projection system, said hub means including (1) a center hub element located adjacent to said annular locking ring central opening and having means for releasably mounting said center hub element to the spindle, and (2) fastening means releasably mounting said center hub element to said film supporting means.

8. The motion picture film shipping and handling system defined in claim 7 further including resilient pads on said annular flanges.

9. The motion picture film shipping and handling system defined in claim 7 wherein said locking ring is annular with a top flange and a lower flange, each locking ring flange having an opening defined therethrough centrally thereof to define an inner edge, said locking ring inner edges being congruent with each other, each of said locking ring flanges having an outer edge, a web connecting said locking ring top flange outer edge to said locking ring lower flange, said locking ring lower flange outer edge being located radially outward of said locking ring top flange outer edge.

10. The motion picture film shipping and handling system defined in claim 9 wherein said film winding ring is spaced from said locking ring lower flange outer edge when said shipping means is in said locking position.

11. The motion picture film shipping and handling system defined in claim 9 wherein said film winding ring is located radially outward of said locking ring lower flange outer edge when said shipping means is in said locking position.

12. The motion picture film shipping and handling system defined in claim 9 wherein said center hub element is Y-shaped with three legs and has a leg outer edge on each of said legs, each leg having a cutout defined therein.

13. The motion picture film shipping and handling system defined in claim 12 further including spaces, each spacer including an anvil element located adjacent to said locking ring lower flange and having a screw thread and a clamping surface thereon, a clamping screw located adjacent to said locking ring top flange and having a clamping surface thereon and a screw thread on said anvil element which threadably engages the screw thread on said anvil element to bring said clamping screw clamping surface towards said anvil element clamping surface, said center hub element leg outer edges being located between said clamping screw and said anvil element clamping surfaces when said center hub element is in place on said locking ring to be clamped between said anvil and said clamping screw, said outer edge cutouts being located adjacent to said film supporting means fastener means.

14. The motion picture film shipping and handling system defined in claim 13 further including an annular cutout defined in said clamping screw clamping surface.

15. The motion picture film shipping and handling system defined in claim 14 further including a position holding element located between said clamping screw and said anvil element.

16. The motion picture film shipping and handling system defined in claim 15 wherein said position holding element includes a frusto-conical element on said anvil element and a compression spring interposed between said frusto-conical element and said clamping screw, said leg outer edge cutouts being located adjacent to said frusto-conical element.

17. The motion picture film shipping and handling system defined in claim 13 wherein each leg has a semicircular cutout defined in the outer edge thereof.

18. The motion picture film shipping and handling system defined in claim 9 wherein said locking ring web is cylindrical and said locking ring top and lower flanges are spaced apart from each other.

19. The motion picture film shipping and handling system defined in claim 18 wherein said film supporting means fastening means extend through said locking ring.

20. The motion picture film shipping and handling system defined in claim 19 wherein said locking ring further includes spacer means surrounding said film supporting means fastening means between said locking ring flanges.

21. The motion picture film shipping and handling system defined in claim 20 further including set screw means mounted on said locking ring for connecting each film supporting means flange to an adjacent locking ring flange.

22. The motion picture film shipping and handling system defined in claim 21 wherein said locking ring top and lower flanges outer edges are congruent with each other.

23. The motion picture film shipping and handling system defined in claim 22 wherein said shipping means includes a cylindrical inner surface which slidably engages said locking ring cylindrical web and an outer surface which is sloped toward said shipping means inner surface with a slope which corresponds to the slope of said film winding ring inner surface, said shipping means outer surface slidingly engaging said film winding ring inner surface.

24. The motion picture film shipping and handling system defined in claim 22 wherein said annular film winding ring inner surface is sloped toward said locking ring cylindrical web.

25. The motion picture film shipping and handling system defined in claim 24 wherein said shipping means further includes a plate element located adjacent to said locking ring central opening.

26. The motion picture film shipping and handling system defined in claim 22 wherein said film supporting means fastening means extend through said shipping means plate.

27. The motion picture film shipping and handling system defined in claim 22 said annular film winding ring inner surface is sloped toward said locking ring cylindrical web.

28. The motion picture film shipping and handling system defined in claim 27 wherein said shipping means includes a plurality of balls located between said locking ring top and lower flanges and between said locking ring web and said film winding ring sloped inner surface.

29. The motion picture film shipping and handling system defined in claim 28 wherein said center hub element is Y-shaped with three legs and has a leg outer edge on each of said legs, each leg having a cutout defined therein.

30. The motion picture film shipping and handling system defined in claim 29 wherein each of said spacer means includes an anvil element located adjacent to said locking ring lower flange and having a screw thread and a clamping surface thereon, a clamping screw located adjacent to said locking ring top flange and having a clamping surface thereon and a screw thread on said anvil element which threadably engages the screw thread on said anvil element to bring said clamping screw clamping surface towards said anvil element clamping surface, said center hub element leg outer edges being located between said clamping screw and said anvil element clamping surfaces when said center hub element is in place on said locking ring to be clamped between said anvil element and said clamping screw, said outer edge cutouts being located adjacent to said film supporting means fastener means.

31. The motion picture film shipping handling system defined in claim 30 further including an annular cutout defined in said clamping screw clamping surface.

32. The motion picture film shipping handling system defined in claim 31 further including a position holding means located between said clamping screw and said anvil.

33. The motion picture film shipping and handling system defined in claim 31 further including a frusto-conical element on said anvil element and a compression spring interposed between said frusto-conical element and said clamping screw, said leg outer edge cutouts being located adjacent to said frusto-conical element.

34. The motion picture film shipping and handling system defined in claim 30 wherein each leg has a semicircular cutout defined in the outer edge thereof.

35. The motion picture film shipping handling system defined in claim 9 wherein said film supporting means fastening means includes a plurality of Norway bolts, and said film supporting means annular flange include holes and slots for receiving and accommodating heads of said Norway bolts.

36. The motion picture film shipping handling system defined in claim 35 further including a carrying handling attached to said carrying case.

37. The motion picture film shipping and handling system comprising
A) a case which includes
 (1) two substantially identical case half sections, with each half section having
  (a) an annular outer wall having an inner and an outer diameter,
  (b) an annular inner wall having an inner and an outer diameter,
  (c) an annular central wall connected to said inner wall and to said outer wall,
  (d) a hub section connected to said inner wall,
  (e) each case section further including a plurality of strap receiving slots defined therein, and a plurality of straps attached thereto,
 (2) said inner and outer walls and said central wall of one half section co-operating with the inner and outer walls and the central wall of the other section to define an annular chamber when one case half section is in contact with the other case half section,
 (3) a case closing means for holding said case half sections together, and
 (4) a plurality of shipping screws threadably mounted on each of said case sections near said hub section of each case section.

38. The motion picture film shipping handling system defined in claim 37 wherein said case flexes to dissipate impact forces applied thereto.

39. The motion picture film shipping handling system defined in claim 37 wherein each case section further includes a plurality of strap receiving slots defined therein, and a plurality of straps attached thereto.

40. The motion picture film shipping handling system defined in claim 39 wherein said straps are resilient.

* * * * *